United States Patent [19]
Fourie

[11] Patent Number: 6,146,437
[45] Date of Patent: Nov. 14, 2000

[54] METAL CONTAINING COMPOUND REDUCTION AND MELTING PROCESS

[75] Inventor: Louis J. Fourie, Pretoria West, South Africa

[73] Assignee: IPCOR NV, Curacao, Netherlands Antilles

[21] Appl. No.: 09/171,457

[22] PCT Filed: Apr. 17, 1997

[86] PCT No.: PCT/EP97/01999

§ 371 Date: Feb. 12, 1999

§ 102(e) Date: Feb. 12, 1999

[87] PCT Pub. No.: WO97/40197

PCT Pub. Date: Oct. 30, 1997

[30] Foreign Application Priority Data

Apr. 19, 1996 [ZA] South Africa .......................... 96/3126

[51] Int. Cl.[7] .............................. C21B 11/00; C21C 7/00; C22B 4/00

[52] U.S. Cl. ...................... 75/10.14; 75/10.15; 75/10.18; 75/10.62; 75/10.63; 75/560; 75/569; 373/161

[58] Field of Search ............................. 75/10.14, 10.15, 75/10.18, 10.62, 10.63, 499, 503, 504, 538, 569; 373/161, 163, 159

[56] References Cited

U.S. PATENT DOCUMENTS

| | | | |
|---|---|---|---|
| 932,459 | 8/1909 | Frick | 373/161 |
| 1,915,243 | 6/1933 | Rohn | 373/161 |
| 2,102,582 | 12/1937 | Summey | 373/161 |
| 4,012,226 | 3/1977 | Geck et al. | 75/499 |
| 5,411,570 | 5/1995 | Fourie | 75/10.15 |

OTHER PUBLICATIONS

The American Heritage Dictionary of the English Language, Third Edition 1992. Houghton Mifflin Company.

Harten, K.P., et al., "Umschau", *Stahl Und Eisen*, 74(5), 291–302, (Feb. 1954).

*Primary Examiner*—Roy V. King
*Assistant Examiner*—Tima McGuthry-Banks
*Attorney, Agent, or Firm*—Schwegman, Lundberg, Woessner & Kluth, P.A.

[57] ABSTRACT

The present invention provides a metal containing compound reduction and melting process which entails feeding a burden made of a mixture of the metal containing compound and a suitable reductant in particulate form into an electrically heatable vessel which contains a bath of the metal in liquid form so that a reaction zone is formed in the burden in which the metal containing compound is reduced and a melting zone is formed below the reaction zone in which the reduced metal is melted; and controlling the process in such a manner that substantially all of the reduction of the metal containing compound takes place in the solid phase. The present invention also provides an apparatus for carrying the process into operation, which has a single compartment channel type induction furnace in which the reduction and melting are carried out, the compartment being provided with at least one feeding port for the burden; at least one exit port for the liquid metal product; and at least one exit port for any slag formed in the reaction.

13 Claims, 1 Drawing Sheet

METAL CONTAINING COMPOUND REDUCTION AND MELTING PROCESS

This application is a national stage of PCT/EP97/01999 filed Apr. 17, 1997.

This invention relates to a metal containing compound reduction and melting process of the type which entails feeding a burden comprising a mixture of the metal containing compound and a suitable reductant in particulate form into the heating vessel of a channel type induction furnace which contains a bath of the said metal in liquid form so that at least one heap of burden forms above the metal bath.

Such process is known from U.S. Pat. No. 5,411,570.

Most conventional metal containing compound reduction processes involve the heating of the metal containing compound (usually the metal oxide) in the presence of a reductant such as a suitable carbon containing compound or the like. The metal containing compound and reductant are usually collectively referred to as the burden.

In the aforesaid conventional processes, the rate at which such heating takes place is usually so rapid that at least a substantial part of the burden is melted before the reduction reactions are completed. A substantial amount of the reduction accordingly takes place in the liquid phase.

On such melting of the burden, a slag is formed which, apart from the oxides of the said metal containing compound, also contains the oxides of other metals which may be present in the burden.

In order to recover the said metal containing compound from its oxide in the slag, a further amount of the reductant is required in the reaction which can accordingly give rise to a metal product with an unwanted high carbon content.

Such high carbon in the product is usually subsequently reduced by oxidation, either by adding to the product oxygen as gaseous oxygen or air, or by utilising a suitable metal oxide present in the reaction medium. Such oxidation reaction accordingly also takes place in the liquid phase.

It will be appreciated that apart from requiring an initial excess of reductant, the subsequent oxidation of such excess entails a further step in the process.

As a result of both the aforesaid reduction and oxidation reactions, relatively large volumes of unwanted gas are formed below the surface of the liquid metal and slag which then escape in the form of bubbles from the liquid metal and slag.

In above-mentioned U.S. Pat. No. 5,411,570 a steel making process is disclosed in which the burden is added to the furnace in two heaps which remain separated from each other by a slag layer, floating on top of the liquid metal bath. In this arrangement it is possible for the burden to pass directly into the metal bath or any slag which may be present, so that at least part of the reduction of the burden takes place in the liquid phase, which not only gives rise to unwanted gas formation in the furnace but also to a potential loss of product.

It is accordingly an object of this invention to provide a metal reduction and melting process with which the aforesaid problems can be overcome or at least minimised.

According to the invention this object is achieved by a process of the type described, in which the burden is fed into the vessel in such a manner and rate that it forms a continuous layer of burden which extends in the manner of a bridge over the whole of the liquid bath and any slag which may be present, with the result that a reaction zone is formed in the burden in which all the metal containing compound can be reduced, and a melting zone is formed below the metal reduction zone in which all the reduced metal can be melted; and controlling such process in such a manner that said continuous layer is maintained during substantially the whole duration of the process, and so that all the reduction of the metal containing compound takes place in the solid phase.

It will be appreciated that because substantially no liquid phase reactions take place during the process according to the invention, the aforesaid unwanted gas evolution is practically eliminated, and in practice the substantial absence of bubble formation in the liquid metal bath and slag which is formed is used as an indication that the process is being controlled correctly.

It will be appreciated further that because the process can be carried out in such a manner that there is substantially no need for the subsequently removal of any excess reductant, the number of steps in the process is reduced relative to what the case is in the aforesaid known processes.

Further according to the invention the control of the process is effected by controlling at least one of the following parameters:

(1) the manner in, and rate at, which the burden is fed into the vessel;
(2) the particle size of the burden;
(3) the degree of mixing of the burden, and
(4) the rate at which heat is supplied to the vessel.

Since according to the invention the burden is fed into the vessel in such a manner and rate that it forms a continuous layer of burden over the whole of the liquid bath and any slag which may be present, any unreacted burden will be prevented from coming directly into contact with the liquid metal and slag. Such "short circuiting", which could give rise to at least some of the reactions taking place in the fluid phase, is accordingly substantially eliminated.

Where the burden is, for example, fed into the vessel through spaced apart feeding ports to form adjacently located heaps of burden inside the vessel, the process includes the step of ensuring that such feeding is effected in such a manner that the bottoms of the heaps merge to define the continuous layer of burden, which extends in the manner of a bridge over the liquid bath and slag. Such bridge accordingly prevents burden material falling from the heaps from coming directly into contact with the liquid metal or slag.

The fact that such a bridge is being formed can be established in any suitable manner such as, for example, visually, and/or by means of image recording apparatus, such as cameras, etc. In practice, such visual recording may be effected by inserting a rigid element in the manner of a "dip stick" from the top of the vessel into the burden.

The formation of the said bridge may be effected by controlling the size of the burden heaps inside the vessel, or alternatively and/or additionally, it may be done by the strategic location of the ports through which the burden is fed into the vessel and/or by controlling the number of such ports and the rate at which the burden is fed through them.

Further according to the invention the particle size of the burden is so chosen that it can pass through a 10 mm, preferably 6 mm, more preferably 3 mm, sieve.

Applicant has found that when a burden of such small particle size is employed, substantially the whole of each particle is reduced to the particular metal in the reaction zone and accordingly remains solid before the temperature of the particle is elevated to that required for the melting of unreduced oxides which may be present in the particle.

There is accordingly very little tendency for any liquid metal in the form of the metal oxide melting at a lower temperature than the metal, to escape from such a particle into the slag.

Thus, for example, in the case of iron, the nucleus of the particle usually comprises FeO, which melts at a temperature of 1378° C., while the crust of the particle comprises Fe which only melts at 1535° C. Accordingly, if larger particles than those stipulated above are employed, the temperature of the nucleus of such a particle could be raised to the aforesaid temperature of 1378° C. before all the Fe or FeO in the particle is reduced, which may lead to the liquid FeO escaping from the nucleus.

It will be appreciated that because the said solid phase reactions are diffusion controlled, the maximum rate of heat input which will be required will be a function of the particle size and degree of mixing of the components of the burden, such degree of mixing preferably being such that the burden comprises a homogeneous mixture.

Further according to the invention the process may include the step of burning above the burden the CO which is formed during the reduction of the metal containing compound, and which permeates through the burden.

Such burning may, for example, be effected by suitable oxygen and/or air burners located in the vessel above the burden.

It will be appreciated that the heat so produced will also serve to increase the temperature inside the vessel, mainly through radiation from the roof of the vessel.

Preferably the reaction vessel comprises the heating compartment of a channel type induction furnace.

Applicant has found such an arrangement particularly suited because of the ease with which the rate of heating can be controlled in such a furnace.

Further according to the invention an apparatus for carrying the aforesaid process into operation comprises a single compartment channel type induction furnace in which the said reduction and melting are carried out, the compartment being provided with at least one feeding port for the burden and at least one exit port for the liquid metal product; and/or any slag formed in the reaction, said at least one feeding port being so located and of such a size that the burden introduced through it can extend as a continuous layer over the whole of the liquid metal bath and any slag which may be present in the compartment.

In a preferred form of the invention, the metal containing compound preferably comprises or includes an iron containing compound. In other forms of the invention the metal of the metal containing compound may comprise or include any other suitable one such as chromium and/or manganese and/or copper and/or zinc and/or lead, etc.

One embodiment of the invention will now be described by way of example with reference to the enclosed drawing, which is a diagrammatic cross sectional view through a furnace according to the invention.

BRIEF DESCRIPTION OF THE DRAWING

In this embodiment of the invention a channel type induction furnace 10 is utilised which comprises an elongated tubular compartment 11 of circular configuration in cross section which is provided along its bottom with two rows of electrically operated inductors 12, each row comprising five such inductors of a capacity in the order of 2.2 MW each.

Compartment 11 includes two parallel extending rows of feeding ports of which only two, 13 and 14, are shown, which extend along opposite longitudinal sides of compartment 11. These ports are utilised for introducing a burden 15 to furnace 10 to form two longitudinally extending heaps 16 and 17 which float on a liquid metal bath 18. If required, the latter can initially be introduced to vessel 11 through a feeding port, not shown.

Figure 1:
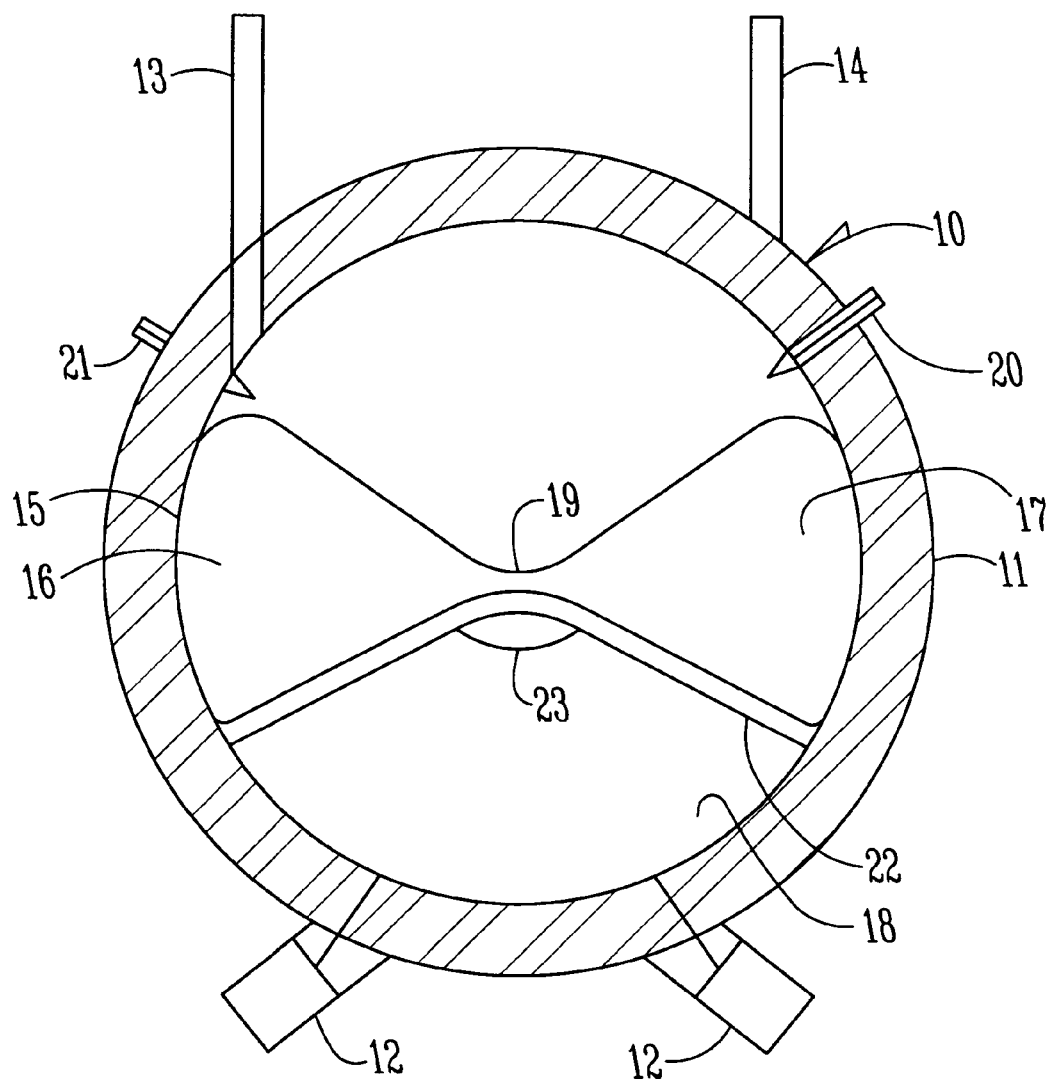

Burden 15 comprises a homogeneous mixture in particulate form of a carbon containing compound such as coal, for example, and iron oxide; the carbon containing compound being present in a concentration slightly less than that representing the stoichiometric amount of carbon necessary for reducing the ore; and the particle size of burden 15 being such that it can pass through a 3 mm sieve.

Burden 15 is introduced to vessel 11 in such a manner and at such a rate that the bottoms of heaps 16 and 17 merge with each other to form a bridge 19 of burden material which extends over liquid bath 18.

The fact that the bridge 19 is being formed can, for example, be established visually by means of a 'dip stick' which is inserted from above into vessel 11, or by means of a suitable inspection window (not shown) in the wall of vessel 11. It may also be established by means of a suitable image recording apparatus (also not shown) located inside vessel 11.

Vessel 11 is also provided along its upper end with a plurality of oxygen burners of which only two, 20 and 21, are shown, by means of which the CO formed in the reaction, and which permeates through the upper layer of burden 15, can be burnt.

In operation, a reaction zone is created in burden 15 of heaps 16 and 17 which extends virtually from the bottoms of the heaps to their upper ends. At the same time a melting zone 22 is formed which extends between the bottoms of heaps 16 and 17 and the upper surface of liquid bath 18. During the reaction the reduced burden 15 moves under the influence of gravity from the reaction zone towards melting zone 22.

The slag which is formed during such melting floats on top of bath 18 in a tunnel 23 which also extends below melting zone 22. Tunnel 23 leads to a slag exit port (not shown) in vessel 11, and burden feed ports 13 and 14 are so arranged relative to such slag exit port that the slag in tunnel 23 is directed towards it.

During the operation of the process, bridge 19 serves to prevent any burden material 15 from falling directly from heaps 16 and 17 into the slag in tunnel 23, or into the liquid metal in bath 18, thus preventing any 'short circuiting'.

The heat supplied to bath 18 through inductors 12 diffuses into burden 15 in heaps 16 and 17 and this, together with the heat from the CO being burnt by burners 20 and 21, causes the iron oxide and carbon of burden 15 to react, which results in the reduction of the iron oxide. Almost all of such reduction, which accordingly takes place in the solid phase, takes place in the uppermost 20 mm layer of heaps 16 and 17, mainly due to the heat being supplied to such layer from the burning of the CO by burners 20 and 21. At the same time the solid reduced iron is melted in zone 22, from where it passes under gravity into bath 18.

It will be appreciated that apart from overcoming the problems referred to in the preamble of this specification as being encountered with the known arrangements, a further advantage of the process according to the invention is that because it can operate with a burden of such small particle size, burdens can be used which normally would not be usable otherwise than through prior pelletization and/or sintering.

It will appreciated further that there are no doubt many variations in detail possible with a metal containing compound reduction and melting process according to the invention, and apparatus utilised for carrying out such process, without departing from the spirit and/or scope of the appended claims.

What is claimed is:

1. A metal containing compound reduction and melting process comprising feeding a burden comprising a mixture of the metal containing compound and a suitable reductant in particulate form into a heating vessel of a channel induction furnace which contains a bath of the said metal in liquid form so that at least one heap of burden forms above the metal bath, characterized in that the burden is fed into the vessel in such a manner and rate that it forms a continuous layer of burden which extends in the manner of a bridge over the whole of the liquid bath and any slag which may be present, with the result that a reaction zone is formed in the burden in which all the metal containing compound is reduced, and a melting zone is formed below the metal reduction zone in which all the reduced metal is melted; and controlling such process in such a manner that said continuous layer is maintained during substantially the whole duration of the process, and so that all the reduction of the metal containing compound takes place in the solid phase.

2. The process of claim 1 wherein the burden is fed into the vessel though spaced apart feeding ports to form adjacently located heaps of burden inside the vessel, of which the bottoms merge to define said continuous layer of burden.

3. The process of claim 1 wherein the formation of the continuous layer is effected by controlling the size of the burden heaps inside the vessel.

4. The process of claim 1 wherein the formation of the continuous layer is effected by locating ports through which the burden is fed into the vessel, by controlling the number of such ports and the rate at which the burden, is fed through them, or by controlling the level of the liquid metal in the vessel.

5. The process of claim 1 wherein the said control of the process is effected by controlling at least one of the following parameters:

(1) the manner in, and rate at, which the burden is fed into the vessel;

(2) the particle size of the burden;

(3) the degree of mixing of the burden;

(4) the rate at which heat is supplied to the vessel.

6. The process of claim 1 wherein the particle size of the burden is such that it passes through a 10 mm sieve.

7. The process of claim 6 wherein the particle size of the burden is such that it passes through a 6 mm sieve.

8. The process of claim 7 wherein the particle size of the burden is such that it passes through a 3 mm sieve.

9. The process of claim 1, wherein CO is formed during reduction of the metal containing compound and permeates through the burden or above the burden, the process further comprising the steps of burning the CO and utilizing heat produced in the reaction.

10. The process of claim 9 wherein such burning is effected by oxygen and/or air burners located in the vessel above the burden.

11. The process of any one of the preceding claims wherein the metal of the metal containing compound comprises or includes any one or more the following: iron, chromium, manganese, copper, zinc, and lead.

12. The process of claim 1 in which the metal of the metal containing compound comprises iron.

13. Apparatus for carrying out the process of claim 1 which comprises a single compartment channel induction furnace in which the said reduction and melting are carried out, the compartment being provided with at least one feeding port for the burden; and at least one exit port for the liquid metal product and/or any slag formed in the reaction, characterized in that the at least one feeding port is so located and of such a size that the burden introduced through it extends as a continuous layer over the whole of the liquid metal bath and any slag present in the compartment.

* * * * *